United States Patent
Doneva et al.

(10) Patent No.: US 9,505,868 B2
(45) Date of Patent: Nov. 29, 2016

(54) POWDERED THERMOPLASTIC POLYOLEFIN ELASTOMER COMPOSITION FOR SLUSH MOLDING

(71) Applicant: Dow Global Technologies LLC, Midland, MI (US)

(72) Inventors: Teodora Doneva, Horgen (CH); Mary Ann Jones, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/767,109

(22) PCT Filed: Feb. 3, 2014

(86) PCT No.: PCT/US2014/014387
§ 371 (c)(1),
(2) Date: Aug. 11, 2015

(87) PCT Pub. No.: WO2014/133717
PCT Pub. Date: Sep. 4, 2014

(65) Prior Publication Data
US 2015/0368391 A1    Dec. 24, 2015

Related U.S. Application Data

(60) Provisional application No. 61/770,626, filed on Feb. 28, 2013.

(51) Int. Cl.
| | |
|---|---|
| *C08L 23/06* | (2006.01) |
| *C08L 53/00* | (2006.01) |
| *C08F 299/02* | (2006.01) |
| *C08L 23/08* | (2006.01) |

(52) U.S. Cl.
CPC .............. *C08F 299/02* (2013.01); *C08L 23/06* (2013.01); *C08L 23/0807* (2013.01); *C08L 23/0815* (2013.01); *C08L 53/00* (2013.01); *C08L 2666/06* (2013.01)

(58) Field of Classification Search
None
See application file for complete search history.

(56) References Cited

U.S. PATENT DOCUMENTS

| 4,650,126 A | 3/1987 | Feder et al. |
|---|---|---|
| 6,803,417 B2 | 10/2004 | Cree et al. |
| 7,037,979 B2 | 5/2006 | Kakarala et al. |
| 2004/0044111 A1 * | 3/2004 | Kakarala ................ C08L 23/10 524/442 |
| 2004/0147680 A1 | 7/2004 | Sugimoto |

FOREIGN PATENT DOCUMENTS

WO    WO 2011/034776    *  3/2011

* cited by examiner

*Primary Examiner* — Jeffrey Mullis

(57) ABSTRACT

The present invention relates to a thermoplastic polyolefin elastomer composition in powder form comprising an olefin block copolymer and optionally a high density polyethylene (HDPE), said composition having a Shore A hardness greater than 75, a Tg less than −45° C., a distinct melting peak greater than 95° C., a zero shear viscosity equal to or less than 1,200 Pa-s and a particle size distribution wherein 85 percent of the particles fall between 150 microns to 420 microns and no particles are greater than 500 microns. Said composition demonstrates good pulverizing and flow characteristics at a temperature of 5° C. or less than the distinct melting peak of the olefin block copolymer. In another aspect, this invention relates to a process for preparing said thermoplastic polyolefin elastomer powder and applications for using said powder. In a further aspect, this invention relates to slush molding or rotational molding said thermoplastic polyolefin elastomer composition into skins, for example skins for automotive interior applications, sporting good applications, housing and building applications, packaging materials, covering materials, toys, hollow parts, and the like.

4 Claims, No Drawings

US 9,505,868 B2

POWDERED THERMOPLASTIC POLYOLEFIN ELASTOMER COMPOSITION FOR SLUSH MOLDING

FIELD OF THE INVENTION

The present invention relates to a thermoplastic polyolefin elastomer composition in powder form comprising an olefin block copolymer. Said composition demonstrates good pulverizing and flow characteristics at ambient temperature and above. In another aspect, this invention relates to a process for preparing said thermoplastic polyolefin elastomer powder and applications for using said powder. In a further aspect, this invention relates to slush molding or rotational molding said thermoplastic polyolefin elastomer composition into skins, particularly skins for automotive interior applications such as instrument panels.

BACKGROUND OF THE INVENTION

There are several methods to make skins for plastic articles, for example skins on an automotive interior article, such as an instrument panel. Positive thermoforming, negative thermoforming, sprayed polyurethane (PU), and shush molding are four major processes used to make skins for such interior articles. Slush molding and sprayed PU offer the most design freedom with some process advantages. The overall system cost for slush molding is much lower than sprayed PU.

In the slush molding technique, a free-flowing, powdered polymer is charged to an open top container or box, i.e., a slush box. A heated mold in the form of the article or object to be molded is clamped on top of the slush box, and the container rotated in a manner such that the free-flowing polymer powder contacts the hot mold where the powder melts and flows over the mold. The container is then returned to its original position, the mold removed from the container, and the article removed from the mold. This technique can realize complex shapes with sharp edges and excellent grain retention.

Introduction of passenger and door airbags has changed the requirement for automotive interior skins from predominately appearance only criteria to that of a safety composition. Until recently, polyvinyl chloride (PVC) resins were the material of choice for interior skins, and they are ideally suited for slush molding. However, PVC formulations suffer from migration and volatilization of the plasticizers over time, and this leads both to physical property changes in the PVC as it ages and to fogging of the car window glass. PVC also suffers from being heavier than alternative materials (an important consideration in the current design of automobiles with the emphasis on lighter materials to reduce the overall weight of the vehicle and thus increase its gas efficiency). Additionally, the hardness, storage modulus, and brittleness of PVC increases as the ambient temperature decreases, and thus at low temperatures, e.g., about −40° C., the instrument panel skin upon airbag deployment could splinter.

An alternative to PVC is thermoplastic polyurethanes (TPU) which can be engineered to have the necessary flow characteristics required for slush molding. TPU has good scratch and mar properties and better low temperature properties than PVC, but aromatic based TPU has poor ultraviolet (UV) light resistance. Aliphatic isocyanates can be used to prepare TPU having good UV light resistance but at a significant cost penalty.

Blends of polypropylene (PP) and a polyolefinic rubber, referred to as thermoplastic polyolefin (TPO), is yet another alternative. TPO posses better ductility than PVC. Moreover, it retains its ductility over time since it does not contain any low molecular weight plasticizers, as does PVC. TPO performs better in comparison to PVC in interior automotive skin applications. TPO is less expensive as compared to TPU.

A critical property for good slush molding moldability is powder flow for achieving good surface quality in terms of good grain appearance and good grain definition. However, conventional TPO require cryogenic (subzero) pulverization which may create hooks and tails which adversely impacts the powder flow of slush TPO and, hence, the quality of the part, see U.S. Pat. No. 7,037,979 and US Publication No. 2004/0147680, both of which are incorporated herein in their entirety. Additionally, cryogenic pulverization adds complexity and cost to manufacturing a powder TPO. Ambient temperature pulverizing has been disclosed with the addition of a grinding aid. For example, U.S. Pat. No. 4,650,126 discloses the addition of such grinding aids as silica, calcium carbonate, zinc oxide, magnesium oxide, clay, and the like. Another example of ambient grinding with a grinding aid is taught in U.S. Pat. No. 6,803,417 wherein an exotic silane-grafted multi-component TPO composition which requires curing has been disclosed, however at a significant cost penalty.

Thus, there is a need by the automobile manufacturers and others to develop a polymer composition for automotive interior applications, especially a polymer powder for slush molding operations, having adequate hardness (e.g., Shore A hardness) with the ability to be pulverized at ambient temperature or above and having improved flow and sintering characteristics.

SUMMARY OF THE INVENTION

The thermoplastic polyolefin composition of the present invention is such a composition. It is well suited for use in a slush molding or rotational molding process.

In one embodiment, the present invention is an improved thermoplastic polyolefin composition comprising an olefin block copolymer in the form of a powder wherein said composition has a Shore A hardness greater than 75, a Tg less than −45° C., and a distinct melting peak greater than 95° C. as determined by DSC wherein the improvement is that the thermoplastic polyolefin composition has a zero shear viscosity at 230° C. equal to or less than 1,200 Pa-s and a particle size distribution wherein 85 percent of the particles fall between 150 microns to 420 microns and no particles are greater than 500 microns, optionally, the composition further comprises a high density polyethylene (HDPE).

In another embodiment, the thermoplastic polyolefin composition of the present invention comprises:

(i) an olefin block copolymer, comprising one or more hard segment and one or more soft segment and characterized by one or more of the aspects described as follows:

(i.a) has a weight average molecular weight/number average molecular weight ratio (Mw/Mn) from about 1.7 to about 3.5, at least one melting peak (Tm) in degrees Celsius, and a density (d) in grams/cubic centimeter (g/cc), wherein the numerical values of Tm and d correspond to the relationship:

$T_m > -2002.9 + 4538.5(d) - 2422.2(d)^2$ or $T_m > -6553.3 + 13735(d) - 7051.7(d)^2$; or (i.b) has a Mw/Mn from about 1.7 to about 3.5, and is characterized by a heat of fusion (ΔH) J/g and a delta quantity, ΔT, in degrees Celsius defined as the temperature difference between the tallest differential scanning calorimetry (DSC) peak and the tallest crystallization analysis fractionation (CRYSTAF) peak, wherein the numerical values of ΔT and ΔH have the following relationships:

ΔT>−0.1299(ΔH)+62.81 for ΔH greater than zero and up to 130 J/g,

ΔT≥48° C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase: Re>1481−1629(d); or (i.d) has a molecular fraction which elutes between 40° C. and 130° C. when fractionated using, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G'(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (i.g) has an average block index greater than zero and up to about 1.0 and a molecular weight distribution, Mw/Mn, greater than about 1.3.

In a preferred embodiment, the thermoplastic polyolefin composition disclosed herein above is obtained by pulverizing said thermoplastic polyolefin composition at a temperature 5° C. or less than the distinct melting point of the olefin block copolymer.

In yet another embodiment, the present invention is a process for the production of a skin using the thermoplastic polyolefin composition disclosed herein above comprising the steps of:

(a) forming said composition into a powder, preferably at a temperature 5° C. or less than the distinct melting point of the olefin block copolymer, and (b) slush molding said powder into a skin.

In another embodiment, the present invention is a slush molded skin comprising the thermoplastic polymer composition disclosed herein above, preferably the skin is for an instrument panel, a console box, an arm rest, a head rest, a door trim, a rear panel, a pillar trim, a sunvisor, a trunk room trim, a trunk lid trim, an air bag cover, a seat buckle, a head liner, a gloves box, or a steering wheel cover.

DETAILED DESCRIPTION OF THE INVENTION

The present invention is an improved thermoplastic polyolefin composition for making skins by slush molding and/or rotational molding. Previously, we developed a novel thermoplastic polyolefin composition comprising a block copolymer that does not require reduced temperature grinding to provide a powder suitable for shush molding, US Publication No. 2012/0172534. We have now found, a thermoplastic polyolefin composition comprising an olefin block copolymer having a specific combination of viscosity, in particular, zero shear viscosity and specific particle size range/distribution provides an improved powdered thermoplastic polyolefin composition for slush and/or rotational molding wherein a skin may be molded with reduced cycle time and/or more consistent thickness.

The thermoplastic polyolefin composition of the present invention comprises an elastomeric component, sometimes referred to as a soft segment, and a crystalline component, sometimes referred to as a hard segment. The thermoplastic polyolefin composition of the present invention may comprise two polymeric materials, for example, an elastomeric polymer (i.e., the soft segment) and a crystalline polymer (i.e., the hard segment). Preferably, the thermoplastic polyolefin of the present invention comprises a single polymeric material that comprises therein one or more soft segment and one or more hard segment.

Component (i) of the thermoplastic polyolefin composition of the present invention is an olefin block copolymer (OBC). The term "ethylene/alpha-olefin interpolymer" generally refers to polymers comprising ethylene and an alpha-olefin having 3 or more carbon atoms, such as propylene or other $C_4$ to $C_{20}$ alpha-olefins. Preferred alpha-olefins are propylene, 1-butene, 1-pentene, 1-hexene, 1-heptene, 1-decene, 1-dodecene, and most preferred is 1-octane. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an alpha-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer.

The term "multi-block copolymer" refers to a polymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or $M_w/M_n$), block length distribution, and/or block number distribution due to the unique process making of the copolymers. More specifically, when produced in a continuous process, the polymers desirably possess PDI from about 1.7 to about 8, preferably from about 1.7 to about 3.5, more preferably from about 1.7 to about 2.5, and most preferably from about 1.8 to about 2.5 or from about 1.8 to about 2.1.

When produced in a batch or semi-batch process, the polymers possess PDI from about 1.0 to about 2.9, preferably from about 1.3 to about 2.5, more preferably from about 1.4 to about 2.0, and most preferably from about 1.4 to about 1.8. It is noted that "block(s)" and "segment(s)" are used herein interchangeably.

The olefin block copolymers (i) of the present invention are an alpha-olefin interpolymer, specifically an alpha-olefin block copolymer comprising one or more hard segment and one or more soft segment and characterized by one or more of the aspects described as follows:

(i.a) has a weight average molecular weight/number average molecular weight ratio ($M_w/M_n$) from about 1.7 to about 3.5, at least one melting point ($T_m$) in degrees Celsius (° C.), and a density (d) in grams/cubic centimeter (g/cc), wherein the numerical values of Tm and d correspond to the relationship:

$T_m > -2002.9 + 4538.5(d) - 2422.2(d)^2$ or $T_m > -6553.3 + 13735(d) - 7051.7(d)^2$; or (i.b) has a $M_w/M_n$ from about 1.7 to about 3.5, and is characterized by a heat of fusion ($\Delta H$) in Jules per gram (J/g) and a delta quantity, $\Delta T$, in degrees Celsius defined as the temperature difference between the tallest differential scanning calorimetry (DSC) peak and the tallest crystallization analysis fractionation (CRYSTAF) peak, wherein the numerical values of $\Delta T$ and $\Delta H$ have the following relationships:

$\Delta T > -0.1299(\Delta H) + 62.81$ for $\Delta H$ greater than zero and up to 130 J/g, $\Delta T \geq 48°$ C. for $\Delta H$ greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase:

Re>1481−1629(d); or (i.d) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G'(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, $M_w/M_n$, greater than about 1.3; or (i.g) has an average block index greater than zero and up to about 1.0 and a molecular weight distribution, $M_w/M_n$, greater than about 1.3.

Processes for making the ethylene/alpha-olefin interpolymers have been disclosed in, for example, the following patent applications and publications: U.S. Provisional Application Nos. 60/553,906, filed Mar. 17, 2004; 60/662,937, filed Mar. 17, 2005; 60/662,939, filed Mar. 17, 2005; 60/566,2938, filed Mar. 17, 2005; PCT Application Nos. PCT/US2005/008916, filed Mar. 17, 2005; PCT/US2005/008915, filed Mar. 17, 2005; PCT/US2005/008917, filed Mar. 17, 2005; WO 2005/090425, published Sep. 29, 2005; WO 2005/090426, published Sep. 29, 2005; and WO 2005/090427, published Sep. 29, 2005, all of which are incorporated by reference herein in their entirety. For example, one such method comprises contacting ethylene and optionally one or more addition polymerizable monomers other than ethylene under addition polymerization conditions with a catalyst composition comprising the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

The following test methods are used to characterize the olefin block copolymers of the present invention and are discussed in further detail in U.S. Pat. No. 7,355,089 and USP Publication No. 2006/0199930:

"Standard CRYSTAF method" or crystallization analysis fractionation is used to determine branching distributions. CRYSTAF is determined using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

"Flexural/Secant Modulus/Storage Modulus" samples are compression molded using ASTM D 1928. Flexural and 2 percent secant moduli are measured according to ASTM D-790. Storage modulus is measured according to ASTM D 5026-01 or equivalent technique.

"Melt Index" or $I_2$, is measured in accordance with ASTM D 1238, Condition 190° C./2.16 kg. Melt index, or $I_{10}$ is also measured in accordance with ASTM D 1238, Condition 190° C./10 kg. A useful value for comparison is the ratio $I_{10}/I_2$.

"DSC Standard Method" or Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion (ΔH) and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

The observed heat of fusion ($\Delta H_{observed}$) for the second scan is recorded. The observed heat of fusion is related to the degree of crystallinity in weight percent based on the weight of the OBC sample by the following equation:

$$\text{Crystallinity } \% = \frac{\Delta H_{observed}}{\Delta H_{theoretical\ PE}} \times 100$$

where the heat of fusion for isotactic polypropylene ($\Delta H_{theoretical\ PE}$), as reported in B. Wunderlich, Macromolecular Physics, Volume 3, Crystal Melting, Academic Press, New Your, 1980, is 292 J/g of polymer.

"GPC Method" is gel permeation chromatographic for molecular weight determinations. The system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene} = 0.431(M_{polystyrene})$.

Polyethylene equivalent molecular weight calculations are performed using Viscotek TriSEC software Version 3.0.

"Density" measurement samples are prepared according to ASTM D 1928. Measurements are made within one hour of sample pressing using ASTM D792, Method B.

"ATREF" is analytical temperature rising elution fractionation analysis and is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

"$^{13}$C NMR Analysis" samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

"Mechanical Properties—Tensile, Hysteresis, and Tear", stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

"Block Index" of the ethylene/α-olefin interpolymers is characterized by an average block index (ABI) which is greater than zero and up to about 1.0 and a molecular weight distribution, $M_w/M_n$, greater than about 1.3. The ABI is the weight average of the block index (BI) for each of the polymer fractions obtained in preparative TREF (fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the ATREF (analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the inventive copolymer. $T_{AB}$ can be calculated from the mole fraction of ethylene (measured by NMR) using the following equation:

$$\text{Ln } P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. Random ethylene copolymers and/or preparative TREF fractions of random copolymers satisfy the following relationship:

$$\text{Ln } P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from Ln $PX = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from Ln $P_{XO} = \alpha/T_X + \beta$ using a measured value of $T_X$. Once the block index (BI) for each preparative TREF fraction is obtained, the weight average block index, ABI, for the whole polymer can be calculated. Determination of Block Index is also described in US Patent Application Publication No. 2006-019930, which is herein incorporated by reference.

The olefin block copolymers of the present invention have a block index (weight averaged) greater than zero and up to about 1.0, preferably from 0.15 to 0.8, more preferably from 0.2 to 0.7, even more preferably from 0.4 to 0.6.

Optionally, the thermoplastic polyolefin composition of the present invention my further comprises an additional polymer, preferably a substantially linear ethylene polymer, a linear ethylene polymer, a high density polyethylene (HDPE), a low density polyethylene (LDPE), alinear low density polyethylene (LLDPE), a polystyrene, a polycyclohexylethane, a polyester, such as polyethylene terephthalate, an ethylene/styrene interpolymer, syndiotactic PP, syndiotactic PS, an ethylene/propylene copolymer (EP), an ethylene/propylene/diene terpolymer (EPDM), and mixtures thereof. Most preferably, the thermoplastic polyolefin composition of the present invention comprises a HDPE. The HDPE may be in pellet form or preferably powder form.

In one embodiment, the additional polymer is a crystalline polyolefin having a melting point greater than 100° C.

If present, the additional polymer is employed in amounts of equal to or greater than about 1 part by weight, preferably equal to or greater than about 3 parts by weight, more preferably equal to or greater than about 5 parts by weight, and most preferably equal to or greater than about 7 parts by weight based on the weight of the thermoplastic polyolefin composition. In general, the additional polymer is used in amounts less than or equal to about 40 parts by weight, preferably less than or equal to about 20 parts by weight, more preferably less than or equal to about 15 parts by weight, more preferably less than or equal to about 10 parts by weight, and most preferably less than or equal to about 8 parts by weight based on the weight of the thermoplastic polyolefin composition.

The thermoplastic polyolefin composition of the present invention preferably has an $I_2$ melt index (190° C./2.16 kg)

of equal to or less than 15 g/10 min, preferably equal to or less than 14 g/10 min, more preferably equal to or less than 12 g/10 min, and more preferably equal to or less than 10 g/10 min. The thermoplastic polyolefin composition of the present invention preferably has an $I_2$ melt index of equal to or greater than 0.01 g/10 min, preferably equal to or greater than 0.1 g/10 min, more preferably equal to or greater than 1 g/10 min, more preferably equal to or greater than 2.5 g/10 min, and more preferably equal to or greater than 5 g/10/min.

The thermoplastic polyolefin composition of the present invention preferably has an $I_{10}$ melt index (190° C./10 kg) of equal to or less than 100 g/10 min, preferably equal to or less than 90 g/10 min, more preferably equal to or less than 80 g/10 min, and more preferably equal to or less than 75 g/10 min. The thermoplastic polyolefin composition of the present invention preferably has an $I_{10}$ melt index of equal to or greater than 1 g/10 min, preferably equal to or greater than 5 g/10 min, more preferably equal to or greater than 10 g/10 min, more preferably equal to or greater than 15 g/10 min, and more preferably equal to or greater than 20 g/10/min.

Optionally, the thermoplastic polyolefin composition of the present invention may comprise a filler such as calcium carbonate, talc, clay, mica, wollastonite, hollow glass beads, titaninum oxide, silica, carbon black, glass fiber or potassium titanate. Preferred fillers are talc, wollastonite, clay, single layers of a cation exchanging layered silicate material or mixtures thereof. Talcs, wollastonites, and clays are generally known fillers for various polymeric resins. See for example U.S. Pat. Nos. 5,091,461 and 3,424,703; EP 639,613 A1; and EP 391,413, where these materials and their suitability as filler for polymeric resins are generally described.

Fillers may be employed to obtain optimized combinations of toughness and stiffness in the propylene polymer compositions according to the present invention. If present, the filler is employed in an amount of at least about 1 part by weight, preferably at least about 3 parts by weight, more preferably at least about 5 parts by weight, even more preferably at least about 10 parts by weight, and most preferably at least about 15 parts by weight based on the total weight of the composition. Usually it has been found sufficient to employ an amount of filler up to and including about 50 parts by weight, preferably up to and including about 40 parts by weight, more preferably up to and including about 30 parts by weight, more preferably up to and including about 25 parts by weight, more preferably up to and including about 20 parts by weight, and most preferably up to and including about 15 parts by weight based the total weight of the composition.

The claimed thermoplastic polyolefin compositions of the present invention may also optionally contain one or more additives that are commonly used in thermoplastic polyolefin compositions of this type. For example a slip agent, preferred slip agents are a saturated fatty acid amide or ethylenebis(amide), an unsaturated fatty acid amide or ethylenebis(amide) or combinations thereof. Other optional additives include, but are not limited to: ignition resistant additives, stabilizers, colorants, pigments, antioxidants, antistats, flow enhancers, mold releases, such as metal stearates (e.g., calcium stearate, magnesium stearate), nucleating agents, including clarifying agents, plasticizers such as paraffinic or hydrogenated mineral oils, etc. Preferred examples of additives are ignition resistance additives, such as, but not limited to halogenated hydrocarbons, halogenated carbonate oligomers, halogenated diglycidyl ethers, organo-phosphorous compounds, fluorinated olefins, antimony oxide and metal salts of aromatic sulfur, or a mixture thereof may be used. Further, compounds which stabilize polymer compositions against degradation caused by, but not limited to heat, light, and oxygen, or a mixture thereof may be used.

If used, such additives may be present in an amount from at least about 0.01 parts, preferably at least about 0.1 parts, more preferably at least about 1 parts, more preferably at least about 2 parts and most preferably at least about 5 parts by weight based on the total weight of the composition. Generally, the additive is present in an amount less than or equal to about 25 parts, preferably less than or equal to about 20 parts, more preferably less than or equal to about 15 parts, more preferably less than or equal to about 12 parts, and most preferably less than or equal to about 10 parts by weight based on the total weight of composition.

Preparation of the thermoplastic polyolefin compositions of this invention can be accomplished by any suitable mixing means known in the art, including being prepared in a reactor, powder-powder blending, or preferably dry blending the individual components, and subsequently melt mixing (e.g., using a Banbury mixer, an extruder, roll mill, etc.). The melt blended thermoplastic polyolefin may be converted directly to a powder or first comminuted to pellets then pulverized into a powder.

Typically, the solid thermoplastic composition of the present invention is available from bags, gaylords, bulk bins, rail cars, and/or silos in the form of pellets or sometimes powder. The thermoplastic polyolefin composition of the present invention is pulverized, ground, or milled for use in the slush molding process, preferably at ambient temperature. Grinding may occur under ambient atmosphere, e.g., air or under an inert atmosphere such as nitrogen. Further, grinding may occur under ambient pressure, under positive pressure, or under negative pressure. Pellets are transported, from for example their bulk storage, to a feed hopper and fed into the grinding equipment, often the feed is facilitated by a vibration feeder or the like. Any suitable pulverization equipment know in the art is applicable, for example using an attrition mill, a disk mill, a turbo mill, a pin mill, a vertical mill, a linlex mill, a hammer mill, a conical mill, a ball mill, a rod mill, a cutting mill such as a Wiley mill, a powder grinder, and the like. For a good descriptions of some of these mills see US Publication No. 2004/0147680. The ground particulate, or powder, is separated by size via a cyclone, screens, sifters, sieves, rotary gates, or combinations thereof. If necessary, material that is too coarse is recycled through the hopper, feeder, and grinding equipment. The powder is collected, for example in a finished product hopper, and used directly in the slush molding step or packaged into an appropriate container such as a bag or bulk bin.

The grinding of solid thermoplastic polyolefin composition of the present invention occurs under exposure of mechanical forces which breakup the structure by overcoming of the interior bonding forces. After the grinding the state of the solid is changed and may be characterized by one or more of its particle size, its average particle size, its particle size distribution, and/or its particle shape. Thermoplastic compositions for use in the slush molding step of the present invention are preferably characterized by having a particle size of from about 150 microns to about 500 microns, more preferably 150 to 420 microns, and more preferably 150 microns to 420 microns. Preferably 85 weight percent of the particles fall between 150 microns to 420 microns with no particles greater than 500 microns, more preferably, 85 weight percent of the particles fall between 150 microns to 450 microns with no particles greater than 500 microns, m ore preferably, 85 weight percent of the particles fall between 150 microns to 420 microns with no particles greater than 420 microns. Preferably 90 weight percent of the particles fall between 150 microns to 420 microns with no particles greater than 500 microns, more preferably, 90 weight percent of the particles fall between 150 microns to 450 microns with no particles greater than 500 microns, more preferably, 90 weight percent of the particles fall between 150 microns to 420 microns with no particles greater than 420 microns. Preferably 95 weight percent of the particles fall between 150 microns to 420 microns with no particles greater than 500 microns, more preferably, 95 weight percent of the particles fall between 150 microns to 450 microns with no particles greater than 500 microns, more preferably, 95 weight percent of the particles fall between 150 microns to 420 microns with no particles greater than 420 microns.

Preferably, 0 to 10 weight percent of the particles fall between 500 microns and 420 microns, 50 to 60 weight percent fall between 300 microns to 420 microns, 30 to 40 weight percent fall between 150 microns to 300 microns, and 0 to 20 weight percent are less than 150 microns. Preferably, with no particles greater than 500 microns the ground particles have a weight average particle size between about 200 microns to about 425 microns, more preferably of from about 250 microns to about 350 microns, and even more preferably of from about 275 microns to about 325 microns.

A preferred particle size determination method is 200 mm Alpine Air-Jet Sieve using a 25 g sample, at 240 seconds and a 12 inch w.g. delta P.

Preferably the thermoplastic polyolefin composition of the present invention has a dry flow rate, as determined according to ASTM D1895, equal to or less than 40 seconds/100 grams, more preferably equal to or less than 35 seconds/100 grams, more preferably equal to or less than 30 seconds/100 grams.

Further, the thermoplastic olefin composition of the present invention has a zero sheer viscosity of equal to or greater than 200 Pa-s at 230° C., preferably equal to or greater than 300 Pa-s at 230° C., and more preferably equal to or greater than 700 Pa-s at 230° C. The thermoplastic olefin composition of the present invention has a zero sheer viscosity of equal to or less than 1,200 Pa-s at 230° C., preferably equal to or less than 1,100 Pa-s at 230° C. Preferably, zero shear viscosity is determined by complex viscosity versus shear rate curves produced using an Ares dynamic mechanical spectrometer (TA Orchestrator Software, version 6.03). Shear rate sweeps are run in the range of 0.1 to 100 rad/sec, 5 rates/decade, 5% strain, and at four temperatures: 190° C., 210° C., 230° C., and 250° C. The log(1/Eta*) is plotted versus shear stress at each temperature, focusing on the lower shear rate range data. Shear stress data can be calculated as Shear stress=Freq (rad/sec)×Eta*. The y-intercept is determined to get the log (1/Eta*) at zero shear stress and the associated Eta* is calculated. This value is the zero shear viscosity at that given temperature.

The molding step of the method of the present invention is a slush molding process. Into the open top of a slush box is added the thermoplastic polyolefin composition of the present invention as a free flowing powder. A mold heated to a given temperature is fixed to the top of the slush box. The slush box is then rotated through 360° as many times as necessary to achieved the desired thickness of film on the heated mold, preferably rotated at least one time, more preferably 2 times, 3 times, 4 times, or more. The slush box may be rotated in a clockwise direction, a counter clockwise direction, or a combination thereof. The slush box may be rotated a final half turn (i.e. in the upside down position) and held for a desired length of time, for instance 5 seconds, 10, 15, 20, 25, 30 seconds or more then returned to the original position. The process provides a layer of partially or completely melted powder on the mold. Excess powder, if any, is removed, the mold may be further heated if necessary to complete melting, then the mold is cooled with suitable cooling means to form a film, and the film is stripped from mold.

The mold is preferably heated to a temperature of about 180° C. to 350° C., more preferably about 200° C. to 300° C., more preferably 240° C. to 280° C. The heating cycle (time that the mold is held at this elevated temperature to form homogeneous skin) is preferably about 2 to 6 minutes. Under these conditions, the powder of the composition of this invention melts, levels out, and forms a homogeneous skin. Following the heating cycle, the mold and homogeneous skin are cooled and the resulting film or sheet is removed from the mold.

The slush molding process of the present invention yields a resulting film or sheet that is useful as a free-standing material or as part of a laminated structure. The sheet may be embossed with a grain pattern. Such embossed sheet has excellent grain retention and thus has particular use in simulated leather applications and in instrument panel skins and door skins for automobiles. Automotive uses include skins for instrument panels and for other locations such as door panels and other simulated leather coverings. Thickness of the sheet can range from 0.1 mm to 2 mm.

In one embodiment, the present invention is an artificial leather comprising the composition of the present invention.

The molded articles according to the present invention are useful products in the following various fields: (i) in the automobile fields, for example, various automobile parts including interior cover materials of, for example, instrument panels, console boxes, arm rests, head rests, door trims, rear panels, pillar trims, sunvisors, trunk room trims, trunk lid trims, air bag covers, seat buckles, head liners, gloves boxes and steering wheel covers; interior molded articles of, for example, kicking plates and change lever boots; exterior parts of, for example, spoilers, side moles, number plate housings, mirror housings, air dam skirt and mud guards; and other molded articles of automobile parts; (ii) in the sport good fields, decorative parts of sport shoes, grips of rackets, sport tools and goods of various ball games, covering materials of saddles and handlebar grips of bicycles, motor-cycles, fishing lures, balls, and tricycles, etc.; (iii) in the housing and building fields, covering materials of furniture, desks, chairs, etc.; covering materials of gates, doors, fences, etc.; wall decorative materials; covering materials of curtain walls; indoor flooring materials of kitchens, wash rooms, toilets, etc; outdoor flooring materials such as verandas, terraces, balconies, carports, etc.; carpets such as front door or entrance mats, table cloths, coasters, ash tray doilies; (iv) in the industrial part field, grips and hoses for electric tools, etc., and the covering materials thereof; packing materials; and (v) in other fields, covering materials of bags, briefcases, cases, files, pocket books, albums, stationary, camera bodies, dolls and the other toys, hollow parts, a traffic cone, a tank bladder, a gasket, a boat bumper, a medical bulb, a mannequin, a lamp base, a boot, a mat, a foamed article, fabrics, a glove, a tape, a conveyor belt, outdoor furniture webbing, a tarpaulin, a tent, a window shade, wallpaper, a textile print for decorative or enhanced grip use, a coating for metal articles such as a tool handle, a wire basket, a bracket, and molded articles such as watch bands, outer frames of picture or photograph and their covering materials.

Another embodiment of the present invention is the process of modifying the surface of the thermoplastic polyolefin to improve adhesion between a molded skin comprising the thermoplastic polyolefin of the present invention and a foam, preferably a polyurethane (PU) foam. Adhesion between thermoplastic polyolefin skins and PU foam may be improved by surface oxidation of the skin by changing the surface morphology of polyolefin skin i.e., (increasing the surface energy) and/or the use of adhesion promoters such as chemical modification of thermoplastic polyolefin skin surface via introducing polar groups. A preferred chemical modification through surface fictionalization of thermoplastic polyolefin powder, prior to slush molding, may be achieved by atmospheric plasma treatment. The powder is functionalized with a silica forming compound that which can be aerosoled into the nitrogen gas plasma that deposits silica particles/patches onto the surface, for example 3-aminopropyltriethoxysilane (APEO) or an equivalent, and an amine, amide, hydroxyl or carboxylic acid functionality that is induced simultaneously by introduction of $NH_3$, $CO_2$, $H_2O$, allylhydroxide, hydroxyethylacrylate or combinations together with a noble gas He or Ar. This provides in a first instance a non-stickiness of the powder improving the flowability and fusibility and in a second instance an enhanced surface energy induced by the selected functionality.

EXAMPLES

The compositions of Examples 1 to 5 are melt compounded on a 4 inch FCM counter-rotating, non-intermeshing rotor mixer with 15 style rotors. The OCB pellets, black concentrate pellets, and HDPE pellets (when present) fed separately into the mixer. The melt temperature is keep to less than 177° C. The mixer conditions are: RPM of 600; an orifice width of 1 inch; and percent amps of 90. The extruder conditions are: RPM of 54 and head pressure of 1950 psig. The rate is 960 pounds per hour.

The compounded thermoplastic polyolefin compositions are ground on an upright 28 inch cutting AFG Mill with a six deck sifter and a conveying system with exhaust damper to control the temperature to ±2° C. The top plate is stationary and cooled with water while the bottom rotating plate rotates are cooled with air. The stationary disk can be moved for gap adjustment and is set at 0.6 inch. Grinding rate is 100 kg/hr and the temperature is held between 90° C. to 94° C.

The thermoplastic polyolefin compositions and properties for Examples 1 to 5 are summarized in Table 1, in Table 1:

"OBC-1" is an ethylene-octene block copolymer in the form of pellets having an $I_2$ melt index (190° C./2.16 kg) of 5 g/10 min, an $I_{10}$ melt index (190° C./10 kg) of 35 g/10 min, a density of 0.887 g/cc, a percent hard segment of 33, a $T_g$ of −54° C., a melting peak of 120° C. as determined by DSC, a crystallinity of 25 percent, a heat of fusion of 73 J/g, and a Shore A hardness of 85;

"OBC-2" is an ethylene-octene block copolymer in the form of pellets having an $I_2$ melt index (190° C./2.16 kg) of 15 g/10 min, $I_{10}$ melt index (190° C./10 kg) of 105 g/10 min, a density of 0.877 g/cc, a $T_g$ of −54° C., a melting peak of 119° C., a crystallinity of 18 percent, a percent hard segment of 22, a heat of fusion of 54 J/g, and a Shore A hardness of 75;

"HDPE-1" is a high density polyethylene in pellet form having a density of 0.953 g/cc, a melt index $I_2$ of 25 g/10 min, and a Shore D hardness of 65;

"HDPE-2" is a high density polyethylene in pellet form having a density of 0.954 g/cc, a melt index $I_2$ of 20 g/10 min, a Shore D hardness of 57, and is available as HDPE DMDA-8920 from The Dow Chemical Company;

"HDPE-3" is a high density polyethylene in powdered form having a density of 0.962 g/cc, a melt index $I_2$ of 3.2 g/10 min, a D50 of 100 to 160 micron, and a D90 of 140 to 225 micron as determined according to ASTM 1921, and is available as HDPE 96002E from The Dow Chemical Company;

"Black Color" in the form of pellets is a color concentrate comprising charcoal black in a linear low density polyethylene carrier, a lubricant, a thermal stabilizer, and a UV stabilizer available as code 5B8A from Americhem, Inc.;

"Shore A Hardness" is determined according to ASTM D 2240;

"Density" is determined according to ASTM 792 and is reported as grams per cubic centimeter (g/cc);

"Zero Shear Viscosity" is determined from complex viscosity versus shear rate curves produced using an Ares dynamic mechanical spectrometer (TA Orchestrator Software, version 6.03). Shear rate sweeps are run in the range of 0.1 to 100 rad/sec, 5 rates/decade, 5% strain, and at four temperatures: 190° C., 210° C., 230° C., and 250° C. The log(1/Eta*) is plotted versus shear stress at each temperature, focusing on the lower shear rate range data. Shear stress data can be calculated as Shear stress=Freq (rad/sec)×Eta*. The y-intercept is determined to get the log (1/Eta*) at zero shear stress and the associated Eta* is calculated. This value is the zero shear viscosity at that given temperature.

"Tm" is the melting peak and determined according to the DSC method described hereinabove;

"Heat of Fusion" is determined according to the DSC method described hereinabove;

"Melt Index" is determined according to ASTM D 1238 and unless otherwise indicated determined under the conditions for $I_2$ of 190° C./2.16 kg and reported as grams per 10 minutes (g/10 minutes);

"Tear Strength" is determined according to ISO 34, Method B, Procedure A, at 50 mm/min, and angle without cut; and "Tensile" properties are determined according to ISO 37 Type 1 at 500 mm/min on non-aged and aged samples, aged samples are heated at 120° C. for 1000 hours; and "Particle Size" is determined using a 200 mm Alpine Air-Jet Sieve on a 25 g sample for 240 seconds and a 12 w.g. ΔP.

TABLE 1

| Example | 1 | 2 | 3 | 4 | 5 |
|---|---|---|---|---|---|
| Composition, wt % | | | | | |
| OBC-1 | 96 | 56 | | | |
| OBC-2 | | 38 | 95 | 91 | 86 |
| HDPE-1 | | | 5 | | |
| HDPE-2 | | | | | 10 |
| HPPE-3 | | | | 5 | |
| Black Color | 4 | 4 | | 4 | 4 |
| Property | | | | | |
| Shore A Hardness | 83 | 78 | 79.3 | 79.4 | 78 |
| Density, g/cc | 0.892 | 0.886 | 0.88 | 0.888 | 0.895 |
| Zero Shear Viscosity @ 230° C., Pa-s | 1065 | 740 | 795 | 796 | 350 |

TABLE 1-continued

| Example | 1 | 2 | 3 | 4 | 5 |
|---|---|---|---|---|---|
| Tm, °C. | 123 | 123 | 126 | 126 | 126 |
| Heat of Fusion, J/g | 56.6 | 51.7 | 50.7 | 51.3 | 54.8 |
| Melt Index @ 190° C./2.16 kg, g/min | 5.7 | 8 | | 5.7 | 14.8 |
| Tear Strength, N/mm | 54 | 43 | 43 | 44 | 39 |
| Tensile, non-aged | | | | | |
| Break Stress, MPa | 10 | 8 | | | 4 |
| % Elongation | 1000 | 995 | | | 980 |
| Tensile, aged for 1000 hr 120° C. | | | | | |
| Break Stress, MPa | 9 | 6.5 | | | 4 |
| % Elongation | 1000 | 1000 | | | 460 |
| Grinding Temperature, °C. | 95 | 90 | 90 | 90 | 90 |
| Particle Size, wt % | | | | | |
| ≤150 microns | 7.3 | 6.5 | | | 7.4 |
| 150-300 microns | 40.2 | 42.8 | | | 43.2 |
| 300-420 microns | 47 | 45.3 | | | 45 |
| 420-500 microns | 5.5 | 5.4 | | | 4.4 |
| >500 microns | 0 | 0 | | | 0 |

The compositions of Examples 1 and 4 are scaled up for slush molding evaluation on a commercial automobile instrument panel skin. The OCB pellets, black concentrate pellets, and HDPE powder (when present) are melt blended at 140° C. to 170° C. using a counter rotating twin screw extruder having a screw diameter of 100 mm and a L/D of 22 and a through put of 200 to 400 kg/hr. The extruded compounded mixture is ground as described above.

In Table 2:
"Dry flow" funnel method according to ASTM D1895 is used to determine the time for 100 g of powder to flow.

TABLE 2

| Example | 1 | 4 |
|---|---|---|
| Composition, wt % | | |
| OBC-1 | 96 | |
| OBC-2 | | 91 |
| HDPE-3 | | 5 |
| Black Color | 4 | 4 |
| Property | | |
| Shore A Hardness | 85 | 79.4 |
| Density, g/cc | 0.887 | 0.888 |
| Zero Shear Viscosity @ 230° C., Pa-s | 1065 | 796 |
| Dry Flow, 100 g | <30 sec | <30 sec |
| Grinding Temperature, °C. | 90-94 | 90-94 |
| Particle Size, wt % | | |
| ≤150 microns | 10 | 10 |
| >150 microns | 40-45 | 40-45 |
| >250 microns | 45-50 | 45-50 |
| >420 microns | 0 | 0 |

Examples 1 and 4 are slush molded into an automotive instrument panel skin using an electroformed mold. The mold is preheated, the slush box containing the polyolefin thermoplastic composition is attached, the box is rotated, the powder is allowed to gel, the mold is cooled, the box is removed, and the skin is removed from the mold. The mold is preheated to 350° C. for 260 seconds, the mold temperature prior to coating is reduced to 250° C. for 120 sec, the slush box is rotated three times at 250° C. each rotation for 40 sec, after the final rotation, the skin is allowed to gel at 230° C. for 30 sec with water temperature cooling the mold at 65° C., and the box is removed and the skin removed after 60 sec.

The results of performance evaluations of the slush molded skins from Examples 1 and 4 are provided in Table 3, in Table 3:

"Fingernail Scratch" resistance is determined using an ABREX abrasion rig on samples after 24 hours of molding, the maximum force (in N) at which no discernable scratches result is recorded;

"Odor" is determined according to VDA 270-C3; and

"Fogging" is determined according to SAE J1756 on samples after 16 hours of conditioning, testing is run for 3 hours at 100° C. heating and 21° C. cooling, results are reported in mg.

TABLE 3

| Example | 1 | 4 |
|---|---|---|
| Density, g/cc | 0.88 | 0.88 |
| Tensile strength, N/mm² | 5.43 | |
| Fingernail scratch, no grain damage, N | 10 | 10 |
| Odor, rating | 3 | 3 |
| Fogging, mg | 0.1 | 0.1 |
| Tg, °C. | −53 | −53 |

What is claimed is:

1. A process for the production of a skin comprising the steps of:
   (a) pulverizing, grinding, or milling into a powder a thermoplastic polyolefin composition comprising an olefin block copolymer with a melting peak as determined by DSC, and
   (b) slush molding or rotational molding said powder into a skin,
   wherein said thermoplastic polyolefin composition has a Shore A hardness greater than 75, a Tg less than −45° C., a melting peak greater than 95° C. as determined by DSC, a zero shear viscosity at 230° C. equal to or less than 1,200 Pa-s, the powder has a particle size distribution wherein 85 weight percent of the particles fall between 150 microns to 420 microns with no particles greater than 500 microns, and the step of pulverizing, grinding, or milling said composition into a powder is performed at a temperature equal to or greater than 90° C. but 5° C. less than the distinct melting peak of the olefin block copolymer.

2. The process of claim 1 wherein the olefin block copolymer, comprising one or more hard segment and one or more soft segment and characterized by one or more of the aspects described as follows:
   (a) has a weight average molecular weight/number average molecular weight ratio (Mw/Mn) from 1.7 to 3.5, at least one melting peak (Tm) in degrees Celsius, and a density (d) in grams/cubic centimeter (g/cc), wherein the numerical values of Tm and d correspond to the relationship:
   $T_m > -2002.9 + 4538.5(d) - 2422.2(d)^2$ or $T_m > -6553.3 + 13735(d) - 7051.7(d)^2$; or
   (b) has a Mw/Mn from 1.7 to 3.5, and is characterized by a heat of fusion (ΔH) J/g and a delta quantity, ΔT, in degrees Celsius defined as the temperature difference between the tallest differential scanning calorimetry (DSC) peak and the tallest crystallization analysis fractionation (CRYSTAF) peak, wherein the numerical values of ΔT and ΔH have the following relationships:
   ΔT > −0.1299(ΔH) + 62.81 for ΔH greater than zero and up to 130 J/g,
   ΔT ≥ 48° C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship: Re>1481−1629 (d); or (d) has a molecular fraction which elutes between 40° C. and 130° C. when fractionated using TREF, characterized in that the fraction has a molar comonomer content greater than, or equal to, the quantity (−0.2013) T+20.07, where T is the numerical value of the peak elution temperature of the TREF fraction, measured in ° C.; or (e) has a storage modulus at 25° C. (G'(25° C.)) and a storage modulus at 100° C. (G'(100° C.)) wherein the ratio of G'(25° C.) to G'(100° C.) is in the range of 1:1 to 9:1 or (f) has a molecular fraction which elutes between 40° C. and 130° C. when fractionated using TREF, characterized in that the fraction has a block index of at least 0.5 and up to 1 and a molecular weight distribution, Mw/Mn, greater than 1.3; or (g) has an average block index greater than zero and up to 1.0 and a molecular weight distribution, Mw/Mn, greater than 1.3.

3. The process of claim 1 wherein the thermoplastic polyolefin composition further comprises a high density polyethylene (HDPE).

4. The process of claim 1 wherein the skin is for an instrument panel, a console box, an arm rest, a head rest, a door trim, a rear panel, a pillar trim, a sunvisor, a trunk room trim, a trunk lid trim, an air bag cover, a seat buckle, a head liner, a gloves box, or a steering wheel cover.

* * * * *